United States Patent [19]

Ohmae et al.

[11] Patent Number: 5,180,784
[45] Date of Patent: Jan. 19, 1993

[54] ADHESIVE RESIN COMPOSITION

[75] Inventors: Tadayuki Ohmae; Yoshiki Toyoshima; Hisao Tanaka; Mitsuyuki Okada; Harunori Fujita, all of Chiba, Japan

[73] Assignee: Sumitomo Chemical Co., Ltd., Osaka, Japan

[21] Appl. No.: 869,179

[22] Filed: Apr. 16, 1992

[30] Foreign Application Priority Data

Apr. 19, 1991 [JP] Japan .................. 3-088008

[51] Int. Cl.$^5$ .............. C08L 23/04; C08L 23/16; C08J 123/04; C08J 123/16
[52] U.S. Cl. .................. 525/207; 524/517; 525/194; 428/442; 428/476.9; 428/483; 428/516
[58] Field of Search ........................... 525/207

[56] References Cited

U.S. PATENT DOCUMENTS

| 4,370,388 | 1/1983 | Mito et al. ............ 428/461 |
| 4,584,348 | 4/1986 | Nagano ................ 525/207 |
| 4,619,969 | 10/1986 | Doi et al. ............. 525/207 |
| 4,868,052 | 9/1989 | Guerdoux et al. ...... 525/207 |
| 4,946,896 | 8/1990 | Mitsuno et al. ....... 525/207 |
| 4,957,968 | 9/1990 | Adur et al. ........... 525/207 |

FOREIGN PATENT DOCUMENTS

| 0248543 | 12/1987 | European Pat. Off. . |
| 0312664 | 4/1989 | European Pat. Off. . |
| 0465365 | 1/1992 | European Pat. Off. . |
| 60-63240 | 4/1985 | Japan . |
| 62-263241 | 11/1987 | Japan . |
| 63-500179 | 1/1988 | Japan . |
| WO8606394 | 11/1986 | PCT Int'l Appl. . |

Primary Examiner—Carman J. Seccuro, Jr.
Attorney, Agent, or Firm—Sughrue, Mion, Zinn, Macpeak & Seas

[57] ABSTRACT

An adhesive resin composition is disclosed, comprising:

(A) from 2 to 98% by weight of an ethylene copolymer comprising from 50 to 90% by weight of ethylene, from 0 to 49% by weight of an α,β-unsaturated carboxylic acid alkyl ester, and from 0.5 to 10% by weight of maleic anhydride, with the sum of these monomers being 100% by weight;

(B) from 2 to 98% by weight of a crystalline polyethylene resin comprising either an ethylene homopolymer or a copolymer of ethylene and an α-olefin having 3 or more carbon atoms, with an ethylene content being 90% by weight or more; and (C) from 2 to 50% by weight of a non-crystalline or low crystalline olefin copolymer rubber comprising a copolymer of ethylene and an α-olefin having 3 or more carbon atoms, with the sum of the components (A), (B) and (C) being 100% by weight.

4 Claims, No Drawings

ADHESIVE RESIN COMPOSITION

FIELD OF THE INVENTION

The present invention relates to an adhesive resin composition comprising an ethylene copolymer containing maleic anhydride. More particularly, it relates to an adhesive resin composition comprising a blend of, in specific proportions, an ethylene copolymer containing maleic anhydride; a crystalline polyethylene resin comprising either an ethylene homopolymer or a copolymer of ethylene and an α-olefin having 3 or more carbon atoms, with an ethylene content being 90% or more; and a non-crystalline or low crystalline olefin copolymer rubber, which composition shows excellent adhesion to polar materials such as polar high-molecular weight materials.

BACKGROUND OF THE INVENTION

As is well known, polyolefins represented by polyethylene and polypropylene have various excellent physical, chemical, and mechanical properties and good moldability. Due to these advantages and because of their inexpensiveness, polyolefins are being extensively used in a wide range of industrial fields. However, since such polyolefins are nonpolar, they involve such a defect that it is difficult to make composite materials with polar materials such as metals, glass, and polar high-molecular weight materials. As an expedient for overcoming this defect, copolymerization of olefin polymers with monomers having a polar group is widely known. However, it is hard to say that such copolymers have sufficient adhesion and, in addition, their heat resistance is insufficient. Under these circumstances, it has been proposed in JP-W-63-500179 to blend these copolymers with polyolefins. (The term "JP-W" as used herein means an "unexamined published international patent application".) Further, JP-A-60-63240 proposes to blend those copolymers with elastomers. (The term "JP-A" as used herein means an "unexamined published Japanese patent application".) However, these proposed compositions do not always show sufficient adhesive strength. Although blending with a large proportion of an elastomer brings about a slight improvement in adhesive strength, such a composition not only has poor mechanical strength and but also, when molded into a film, shows poor anti-blocking properties and reduced solvent resistance.

JP-A-62-263241 proposes a composition comprising an ethylene copolymer containing a polar group, polypropylene, and an olefin copolymer rubber.

The above composition, however, has been found to have still insufficient adhesion to polar materials such as polar high-molecular weight materials.

The present inventors have conducted extensive studies on resin compositions obtained by melt kneading an ethylene copolymer containing maleic anhydride with a crystalline polyethylene resin, with respect to the kind, proportion, etc. of the blended resin. As a result, it has been found that the presence of both a high-rigidity component and a low-rigidity component is requisite for the development of sufficient adhesive strength and that there is an optimum rigidity value which an adhesive resin composition should have for attaining sufficient adhesive strength. It is known that the larger the energy absorbed during peeling, the higher the adhesive strength. This energy can be expressed by the product of the stress applied to the peeling site and deformation. If an adhesive resin composition has too low rigidity, the applied stress is small, while if it has too high rigidity, little deformation occurs. Thus, it has been ascertained through extensive investigations that optimum rigidity is present. The necessity of both of a high-rigidity component and a low-rigidity component has been proven by the fact that the presence of both components in an adhesive resin composition changes the deformation mode for the composition from elastic deformation to plastic deformation and, accordingly, serves to increase the consumed amount of peeling energy and make the composition less apt to be peeled off.

It has, therefore, been found that an adhesive resin composition having excellent adhesion can be obtained by adding a crystalline polyethylene resin as a high-rigidity component and a non-crystalline or low crystalline olefin copolymer rubber as a low-rigidity component, in specific proportions, to an ethylene copolymer containing maleic anhydride, and melt kneading these components. The present invention has been completed based on these findings.

SUMMARY OF THE INVENTION

Accordingly, an object of the present invention is to provide a resin composition showing excellent adhesion to polar materials, which can overcome the above-described problems.

Other objects and effects of the present invention will be apparent from the following description.

The adhesive resin composition of the present invention comprises:

(A) from 2 to 98% by weight of an ethylene copolymer comprising from 50 to 90% by weight of ethylene, from 0 to 49% by weight of an α,β-unsaturated carboxylic acid alkyl ester, and from 0.5 to 10% by weight of maleic anhydride, with the sum of these monomers being 100% by weight;

(B) from 2 to 98% by weight of a crystalline polyethylene resin comprising either an ethylene homopolymer or a copolymer of ethylene and an α-olefin having 3 or more carbon atoms, with an ethylene content being 90% by weight or more; and (C) from 2 to 50% by weight of a non-crystalline or low crystalline olefin copolymer rubber comprising a copolymer of ethylene and an α-olefin having 3 or more carbon atoms, with the sum of the components (A), (B) and (C) being 100% by weight.

DETAILED DESCRIPTION OF THE INVENTION

Ethylene copolymer (A) employed in the composition of the present invention is a copolymer comprising ethylene, an α,β-unsaturated carboxylic acid alkyl ester, and maleic anhydride, with an ethylene content being from 50 to 90% by weight, preferably from 60 to 85% by weight, an α,β-unsaturated carboxylic acid alkyl ester content being from 0 to 49% by weight, preferably from 0 to 30% by weight, more preferably from 3 to 25% by weight, and a maleic anhydride content being from 0.5 to 10% by weight, preferably from 1 to 5% by weight, and with the sum of these comonomers being 100% by weight. The α,β-unsaturated carboxylic acid alkyl ester is an alkyl ester of an α,β-unsaturated carboxylic acid having from 3 to 8 carbon atoms such as acrylic acid and methacrylic acid. Specific examples of the ester include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, and isobutyl methacrylate. Of these, methyl acrylate, ethyl acrylate, n-butyl acrylate, and methyl methacrylate are preferred.

The melt flow rate of ethylene copolymer (A) is not particularly limited but preferably is from 0.5 to 200 g/10 min, more preferably from 1 to 50 g/10 min.

Crystalline polyethylene resin (B) employed in the composition of the present invention is either an ethylene homopolymer or a copolymer of ethylene and an α-olefin having 3 or more carbon atoms, with an ethylene content being 90% by weight or more. Examples of the α-olefin include propylene, butene-1, pentene-1, hexene-1, 4-methylpentene-1, and octene-1. Two or more of these α-olefins may be used in combination. Specific examples of crystalline polyethylene resin (B) include various ethylene homopolymers and copolymers such as low-density polyethylene, high-density polyethylene, and linear low-density polyethylenes including ethylene-butene-1 co-polymers, ethylene-hexene-1 copolymers, ethylene-4-methylpentene-1 copolymers, ethylene-octene-1 copolymers, and the like. A mixture of two or more of these polyethylene resins may also be used.

It is preferable in the present invention that crystalline polyethylene resin (B) have a heat of fusion as determined with a differential scanning calorimeter (DSC) of 20 cal/g or more, more preferably 30 cal/g or more and a flexural rigidity modulus of 1,500 kg/cm$^2$ or more, more preferably 2,000 kg/cm$^2$ or more.

Non-crystalline or low crystalline olefin copolymer rubber (C) employed in the composition of the present invention comprises a copolymer of ethylene and an α-olefin having 3 or more carbon atoms. Examples of the α-olefin include ones enumerated above for crystalline polyethylene resin (B), with propylene, butene-1, 4-methylpentene-1, and hexene-1 being preferred. These α-olefins may also be used in combination of two or more thereof. The copolymer may contain a small proportion (3% by weight or less) of a non-conjugated diene. The heat of fusion of this non-crystalline or low crystalline olefin copolymer rubber (C) as determined by DSC is preferably below 20 cal/g, more preferably 15 cal/g or less. The flexural rigidity modulus of rubber (C) is preferably below 1,500 kg/cm$^2$, more preferably 1,000 kg/cm$^2$ or less.

The most preferred as rubber (C) is an ethylene-propylene copolymer rubber.

In the adhesive resin composition of the present invention, the amount of each of the components is as follows: the content of ethylene copolymer (A) is from 2 to 98% by weight, preferably from 5 to 95% by weight, more preferably from 5 to 90% by weight; the content of crystalline polyethylene resin (B) is from 2 to 98% by weight, preferably from 5 to 95% by weight, more preferably from 5 to 90% by weight; and the content of non-crystalline or low crystalline olefin copolymer rubber (C) is from 2 to 50% by weight, preferably from 5 to 40% by weight, more preferably from 5 to 30% by weight, with the sum of the components (A), (B) and (C) being 100% by weight.

The adhesive resin composition containing the components (A) to (C) in such proportions preferably has a flexural rigidity modulus of from 500 to 2,500 kg/cm$^2$, more preferably from 500 to 2,000 kg/cm$^2$.

If the content of the component (B) is below 2% by weight or exceeds 98% by weight, the composition shows poor adhesion.

If the content of the component (C) is below 2% by weight, the composition has poor adhesion. If the content of the component (C) exceeds 50% by weight, the composition has not only poor adhesion but poor mechanical properties and, in addition, films obtained from the composition have poor anti-blocking properties and reduced solvent resistance.

The adhesive resin composition according to the present invention can be produced, for example, by a melt kneading method in which ethylene copolymer (A), crystalline polyethylene resin (B), and non-crystalline or low crystalline olefin copolymer rubber (C) are melt kneaded together by means of an extruder, a Banbury mixer, a kneader, or the like at a temperature between 150° and 300° C., preferably between 190° and 280° C. for a period of time of from 0.3 to 10 minutes, preferably from 0.5 to 5 minutes. From the industrial standpoint, continuous production employing a single-screw or twin-screw extruder is advantageous. If desired, the components (A), (B) and (C) can be blended beforehand in a pelletized state and melt kneaded in the molding stage.

If desired, various additives and fillers can be incorporated into the adhesive resin composition of the present invention during the production of the composition or during the processing of the produced composition. Examples of such additives and fillers include antioxidants, heat stabilizers, light stabilizers, nucleating agents, lubricants, antistatic agents, inorganic or organic fillers, inorganic or organic colorants, anti-corrosive agents, crosslinking agents, blowing agents, plasticizers, fluorescent agents, surface lubricants, and gloss improvers.

The thus-obtained adhesive resin composition of the present invention can tenaciously adhere to various polar materials such as polar high-molecular weight materials, e.g., ethylene-vinyl alcohol copolymers, polyamides, polyethylene terephthalate, and polybutylene terephthalate, and glass.

Using the adhesive resin composition of the present invention, various kinds of composite materials having excellent adhesion, such as covered products, laminates, and reinforced resins, can be produced by utilizing known processing techniques. For example, in producing laminates using the adhesive resin composition, powder coating (such as fluidized bed dip coating, electrostatic coating, and flame spray coating), solution coating, extrusion coating, co-extrusion, dry laminating, hot-press bonding, or insert molding, or a combination of these can suitably be employed depending on the purposes. Further, extrusion, injection molding, or the like can be employed to produce filler-reinforced or fiber-reinforced resins or similar products using the composition of the present invention.

The present invention is illustrated below in more detail with reference to the following examples, but the invention is not construed as being limited thereto.

In the Examples and Comparative Examples, the physical properties were evaluated according to the following test methods.

(1) Melt Flow Rate (MFR):
JIS-K6760 (190° C.)
(2) Flexural Rigidity Modulus (unit: kg/cm$^2$):
ASTM-D747

(3) Maleic Anhydride Content (wt %) in Ethylene Copolymer (A):

A small amount of a sample was purified by dissolution in hot xylene and precipitation with absolute acetone. The purified sample was redissolved in xylene, and the solution was titrated with an NaOH methanol solution using phenolphthalein as an indicator while heating at 110° to 120° C.

(4) α,β-Unsaturated Carboxylic Acid Alkyl Ester Content (wt %) in Ethylene Copolymer (A):

A sample was pressed into a sheet and analyzed by infrared absorption spectrometry, in which the absorbance for an absorption peak appearing at around 1,750 $cm^{-1}$ due to C=O of the ester was corrected with thickness, and the content was determined by the calibration curve method.

(5) Heat of Fusion determined with Differential Scanning Calorimeter (DSC):

DSC-4 manufactured by Perkin Elmer Inc. was used.

A sample was formed into a about 0.5 mm-thick sheet by hot pressing, and a test piece weighing about 10 mmg was cut out of the sheet. This test piece was placed on a sample pan, pre-melted in DSC at 150° C. for 5 minutes, cooled to 50° C. at a rate of 5° C./min, maintained at this temperature for 5 minutes, and then heated to 200° C. at a rate of 5° C./min. Thus, a thermogram was obtained, from which heat of fusion (cal/g) per gram of sample was determined.

(6) Adhesive Strength (unit: g/15 mm):

A film obtained by laminating was cut into a 15-mm width in the machine direction (MD). The adhered laminae were peeled off beforehand at one end of the sample, and the peeled parts of both laminae were secured to the grips of a tensile tester. T-peel was then conducted with this tensile tester by pulling the test piece at a rate of 200 mm/min, and the tensile strength required for the pulling was measured.

EXAMPLE 1

Twenty parts by weight of an ethylene-ethyl acrylatemaleic anhydride copolymer (85/12/3 by weight; MFR, 3 g/10 min; referred to as BD-1) as ethylene copolymer (A), 40 parts by weight of high-density polyethylene (MFR, 13 g/10 min; density, 0.965 g/cm³; heat of fusion by DSC, 47.3 cal/g; referred to as HDPE) as crystalline polyethylene resin (B), and 40 parts by weight of an ethylene-propylene copolymer rubber (MFR, 8 g/10 min; Mooney viscosity ($ML_{1+4}$, 100° C.), 12; density, 0.87 g/cm³; heat of fusion by DSC, 0; referred to as EPR-1) as non-crystalline or low crystalline olefin copolymer rubber (C) were mixed into a uniform mixture with a Henschel mixer. The mixture was melt kneaded with a 30-mmφ twin-screw extruder (TEX 30, manufactured by The Japan Steel Works, Ltd.) at a temperature of 200° C. for an average residence time of 1.0 minute, to obtain an adhesive resin composition. Using this adhesive resin composition and an ethylene-vinyl alcohol copolymer [EVAL EP-F, manufactured by Kuraray Co., Ltd.; referred to as EVOH-F], a two-resin two-layer film in which the two layers each had a thickness of 0.025 mm was prepared by co-extrusion. This co-extrusion was conducted using a die having a width of 250 mm at a processing temperature of 230° C. and at a take up rate of 15 m/min. The adhesive strength between the both resins was measured by the T-peel method and found to be 235 g/15 mm. The results obtained are shown in Table 1.

EXAMPLES 2 AND 3 AND COMPARATIVE EXAMPLES 1 TO 4

The same procedures as in Example 1 were conducted except that the proportions by weight of the three components were changed as shown in Table 1. The results obtained are summarized in Table 1.

TABLE 1

| | A BD-1 | B HDPE | C EPR-1 | Flexural Rigidity Modulus | Ad-herend | Adhesion Strength |
|---|---|---|---|---|---|---|
| Ex. 1 | 20 | 40 | 40 | 1450 | EVOH-F | 235 |
| Comp. Ex. 1 | 100 | — | — | 400 | EVOH-F | 60 |
| Comp. Ex. 2 | 60 | 40 | — | 2370 | EVOH-F | 15 |
| Comp. Ex. 3 | 60 | — | 40 | 220 | EVOH-F | 100 |
| Comp. Ex. 4 | 20 | 80 | — | 5830 | EVOH-F | 5 |
| Ex. 2 | 60 | 20 | 20 | 750 | EVOH-F | 180 |
| Ex. 3 | 40 | 30 | 30 | 1450 | EVOH-F | 235 |

EXAMPLE 4

The same procedures as in Example 1 were conducted except that an ethylene-ethyl acrylate-maleic anhydride copolymer (95/3/2 by weight; MFR, 2 g/10 min; referred to as BD-2) was used as ethylene copolymer (A) in place of BD-1. The results obtained are shown in Table 2.

EXAMPLES 5 AND 6 AND COMPARATIVE EXAMPLES 5 TO 7

The same procedures as in Example 4 were conducted except that the proportions by weight of the three components were changed as shown in Table 2. The results obtained are summarized in Table 2.

TABLE 2

| | A BD-2 | B HDPE | C EPR-1 | Flexural Rigidity Modulus | Ad-herend | Adhesion Strength |
|---|---|---|---|---|---|---|
| Ex. 4 | 20 | 40 | 40 | 1700 | EVOH-F | 330 |
| Comp. Ex. 5 | 100 | — | — | 1390 | EVOH-F | 25 |
| Comp. Ex. 6 | 60 | 40 | — | 3000 | EVOH-F | 10 |
| Comp. Ex. 7 | 60 | — | 40 | 510 | EVOH-F | 100 |
| Ex. 5 | 60 | 20 | 20 | 1510 | EVOH-F | 170 |
| Ex. 6 | 40 | 30 | 30 | 1610 | EVOH-F | 275 |

EXAMPLE 7

The same procedures as in Example 3 were conducted except that linear low-density polyethylene (referred to as LLDPE) having an MFR of 8 g/10 min, a density of 0.925 g/cm³, and a heat of fusion of 31 cal/g was used as crystalline polyethylene resin (B) in place of HDPE. The results are shown in Table 3.

EXAMPLES 8 TO 10

The same procedures as in Example 3 were conducted except that as the adherend, each of EVAL EP-E (manufactured by Kuraray Co., Ltd.; a processing temperature, 230° C.; referred to as EVOH-E), a polyamide (CM 1021, manufactured by Toray Industries, Inc.; processing temperature, 240° C.; referred to as PA), and a copolyamide (5033 B, manufactured by Ube Industries, Ltd., Japan; used at a processing temperature of 210° C.; referred to as Co-PA) was used in place of EVOH-F. The results obtained are summarized in Table 3.

COMPARATIVE EXAMPLE 8

The same procedures as in Example 3 were conducted except that polypropylene (referred to as PPr) (Noblen AW 564, manufactured by Sumitomo Chemical Company, Limited) having an MFR at 230° C. of 9 g/10 min and a density of 0.90 g/cm$^3$ was used in place of HDPE. The results obtained are shown in Table 3.

COMPARATIVE EXAMPLE 9

The same procedures as in Comparative Example 8 were conducted except that an ethylene-propylene copolymer (referred to as EPR-2) having an MFR of 0.4 g/10 min, a Mooney viscosity ($ML_{1+4}$, 100° C.) of 65, a density of 0.87 g/cm$^3$, a heat of fusion of 0 cal/g was used in place of EPR-1 and that the proportions by weight of the three components were changed as shown in Table 3. The results obtained are shown in Table 3.

TABLE 3

| | A | B | | | C | | Flexural Rigidity | | Adhesion |
|---|---|---|---|---|---|---|---|---|---|
| | BD-1 | HDPE | LLDPE | PPr | EPR-1 | EPR-2 | Modulus | Adherend | Strength |
| Ex. 7 | 40 | — | 30 | — | 30 | — | 970 | EVOH-F | 155 |
| Ex. 8 | 40 | 30 | — | — | 30 | — | 1450 | EVOH-E | 255 |
| Ex. 9 | 40 | 30 | — | — | 30 | — | 1450 | PA | 440< |
| Ex. 10 | 40 | 30 | — | — | 30 | — | 1450 | Co-PA | 430 |
| Comp. Ex. 8 | 40 | — | — | 30 | 30 | — | 1150 | EVOH-F | 30 |
| Comp. Ex. 9 | 25 | — | — | 30 | — | 45 | 930 | EVOH-F | 10 |

As described above, the adhesive resin composition of the present invention, obtained by blending a high-rigidity component and a low-rigidity component in specific proportions with a copolymer of ethylene, an α,β-unsaturated carboxylic acid alkyl ester, and maleic anhydride, shows greatly improved adhesion to polar materials. Therefore, it is exceedingly useful in various industrial fields.

While the invention has been described in detail and with reference to specific embodiments thereof, it will be apparent to one skilled in the art that various changes and modifications can be made therein without departing from the spirit and scope thereof.

What is claimed is:

1. An adhesive resin composition comprising:

(A) from 2 to 98% by weight of an ethylene copolymer comprising from 50 to 90% by weight of ethylene, from 0 to 49% by weight of an α,β-unsaturated carboxylic acid alkyl ester, and from 0.5 to 10% by weight of maleic anhydride, with the sum of these monomers being 100% by weight;
   (B) from 2 to 98% by weight of a crystalline polyethylene resin comprising either an ethylene homopolymer or a copolymer of ethylene and an α-olefin having 3 or more carbon atoms, with an ethylene content being 90% by weight or more; and
   (C) from 2 to 50% by weight of a non-crystalline or low crystalline olefin copolymer rubber comprising a copolymer of ethylene and an α-olefin having 3 or more carbon atoms, with the sum of the components (A), (B) and (C) being 100% by weight.

2. An adhesive resin composition as in claim 1, comprising from 5 to 95% by weight of said ethylene copolymer (A), from 5 to 95% by weight of said crystalline polyethylene resin (B), and from 5 to 40% by weight of said non-crystalline or low crystalline olefin copolymer rubber (C), with the sum of the components (A), (B) and (C) being 100% by weight.

3. An adhesive resin composition as in claim 1, comprising from 5 to 90% by weight of said ethylene copolymer (A), from 5 to 90% by weight of said crystalline polyethylene resin (B), and from 5 to 30% by weight of said non-crystalline or low crystalline olefin copolymer rubber (C), with the sum of the components (A), (B) and (C) being 100% by weight.

4. An adhesive resin composition as in claim 1, wherein said ethylene copolymer (A) comprises from 60 to 85% by weight of ethylene, up to 30% by weight of an α,β-unsaturated carboxylic acid alkyl ester, and from 0.05 to 10% by weight of maleic anhydride, with the sum of these monomers being 100% by weight.

* * * * *